(12) United States Patent
Balasubramanian et al.

(10) Patent No.: US 12,340,405 B2
(45) Date of Patent: Jun. 24, 2025

(54) NON-TRANSITORY COMPUTER-READABLE MEDIUM, AND METHOD FOR CONTEXT-BASED CONTENT-SCORING FOR AN ONLINE CONCIERGE SYSTEM

(71) Applicant: Maplebear Inc., San Francisco, CA (US)

(72) Inventors: Ramasubramanian Balasubramanian, San Francisco, CA (US); Saurav Manchanda, Minneapolis, MN (US)

(73) Assignee: Maplebear Inc., San Francisco, CA (US)

( * ) Notice: Subject to any disclaimer, the term of this patent is extended or adjusted under 35 U.S.C. 154(b) by 521 days.

(21) Appl. No.: 17/550,950

(22) Filed: Dec. 14, 2021

(65) Prior Publication Data

US 2023/0186363 A1    Jun. 15, 2023

(51) Int. Cl.
*G06Q 30/0601* (2023.01)
*G06F 16/2455* (2019.01)
*G06N 20/00* (2019.01)

(52) U.S. Cl.
CPC ..... *G06Q 30/0627* (2013.01); *G06F 16/2455* (2019.01); *G06N 20/00* (2019.01); *G06Q 30/0631* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 2020/0004886 A1* | 1/2020 | Ramanath | G06F 16/248 |
| 2022/0245702 A1* | 8/2022 | Sundaresan | G06N 7/01 |
| 2022/0391671 A1* | 12/2022 | Pasternack | G06F 16/9532 |

OTHER PUBLICATIONS

Dato announces new machine learning toolkits and coursera training. (Sep. 29, 2015). Business Wire Retrieved from https://dialog.proquest.com/professional/docview/1717251280?accountid=131444 (Year: 2015).*

* cited by examiner

*Primary Examiner* — Jeffrey A. Smith
*Assistant Examiner* — Ashley D Preston
(74) *Attorney, Agent, or Firm* — Fenwick & West LLP (57) ABSTRACT

An online concierge system selects content for presentation to a user by using a product scoring engine. The product scoring engine generates a user embedding for user data and a query embedding for query data. The product scoring engine generates an anchor embedding based on the user embedding and the query embedding, where the anchor embedding is an embedding in a product embedding space. The product scoring engine compares the anchor embedding to a set of product embeddings to score a set of products for presentation to a user.

18 Claims, 7 Drawing Sheets

NON-TRANSITORY COMPUTER-READABLE MEDIUM, AND METHOD FOR CONTEXT-BASED CONTENT-SCORING FOR AN ONLINE CONCIERGE SYSTEM

BACKGROUND

Machine-learning models can be trained to present content to a user of an online system. For example, a machine-learning model may be trained to select products to present to a user in response to a search query. Conventional machine-learning models determine content to present to a user based on how other users have interacted with content in the past. These conventional machine-learning models typically identify features of users similar to a target user and select content with which the similar users have interacted. However, these machine-learning models often fail to compare the contexts of the target user and the similar user when selecting content. Thus, conventional machine-learning models that simply look at content with which a similar user interacted may provide irrelevant content in the target user's context. For example, if the similar user interacted with a ground beef product in response to a search query for "ground beef," the target user may not interact with the ground beef product if the product was presented in response to a search query for "milk," no matter how similar the users are. Thus, conventional machine-learning models often fail to properly account for context in scoring and selecting content to present to a user.

SUMMARY

An online concierge system uses a product scoring engine to score and select products to present to a user. The product scoring engine may receive user data describing a user that has submitted a search query to the online concierge system and may receive query data describing the search query submitted by the user. The product scoring engine uses a user embedding model to generate a user embedding describing the user based on the user data. A user embedding model is a machine-learning model that is trained to generate a user embedding based on user data. Similarly, the product scoring engine uses a query embedding model to generate a query embedding describing the search query submitted by the user based on the query data. A query embedding model is a machine-learning model that is trained to generate a query embedding describing a search query based on query data.

The product scoring engine generates an anchor embedding by applying an anchor embedding model to the user embedding and the query embedding. An anchor embedding is an embedding in the product embedding space that is generated based on the user embedding and the query embedding. The anchor embedding can be compared to product embeddings describing products to determine products that would be suitable to present to the user associated with the anchor embedding in response to the search query. An anchor embedding model is a machine-learning model that has been trained to generate an anchor embedding based on a user embedding and a query embedding.

The product scoring engine generates product embeddings for a set of candidate products by applying a product embedding model to product data describing the set of candidate products. A product embedding model is a machine-learning model that is trained to generate product embeddings describing products based on product data. The product scoring engine then compares the product embeddings for the set of candidate products with an anchor embedding for a user and the user's search query to generate a set of product scores for the set of candidate products. The online concierge system then selects one or more products of the set of candidate products to present to a user in response to the search query based on the set of product scores generated for the set of candidate products.

The online concierge system may train the user embedding model, query embedding model, product embedding model, or the anchor embedding based on a loss function. The loss function may be based on a triplet loss function, such that the machine-learning models are trained to minimize a distance of anchor embeddings from product embeddings associated with positive examples (e.g., products presented to a user with which the user has interacted) and to maximize a distance from product embeddings associated with negative examples (e.g., products presented to a user with which the user did not interact). In some embodiments, the loss function assigns different weights to positive examples based on a hierarchy of interactions with products. The hierarchy of interactions may reflect that certain interactions with products are more valuable to the online concierge system than other interactions. For example, a user purchasing a product may be a more valuable interaction than when a user simply selects a product to view more information about the product.

By comparing product embeddings to an anchor embedding that is based on a user embedding and a query embedding, the online concierge system can score products based on characteristics about the user and based on the context within which the user is viewing products. Additionally, by applying a loss function that uses a hierarchy of interactions, the online concierge system may ensure that products that lead to more valuable interactions are scored more highly for presentation than products that lead to less valuable interactions.

DETAILED DESCRIPTION

Environment of an Online Concierge System

Figure 1:
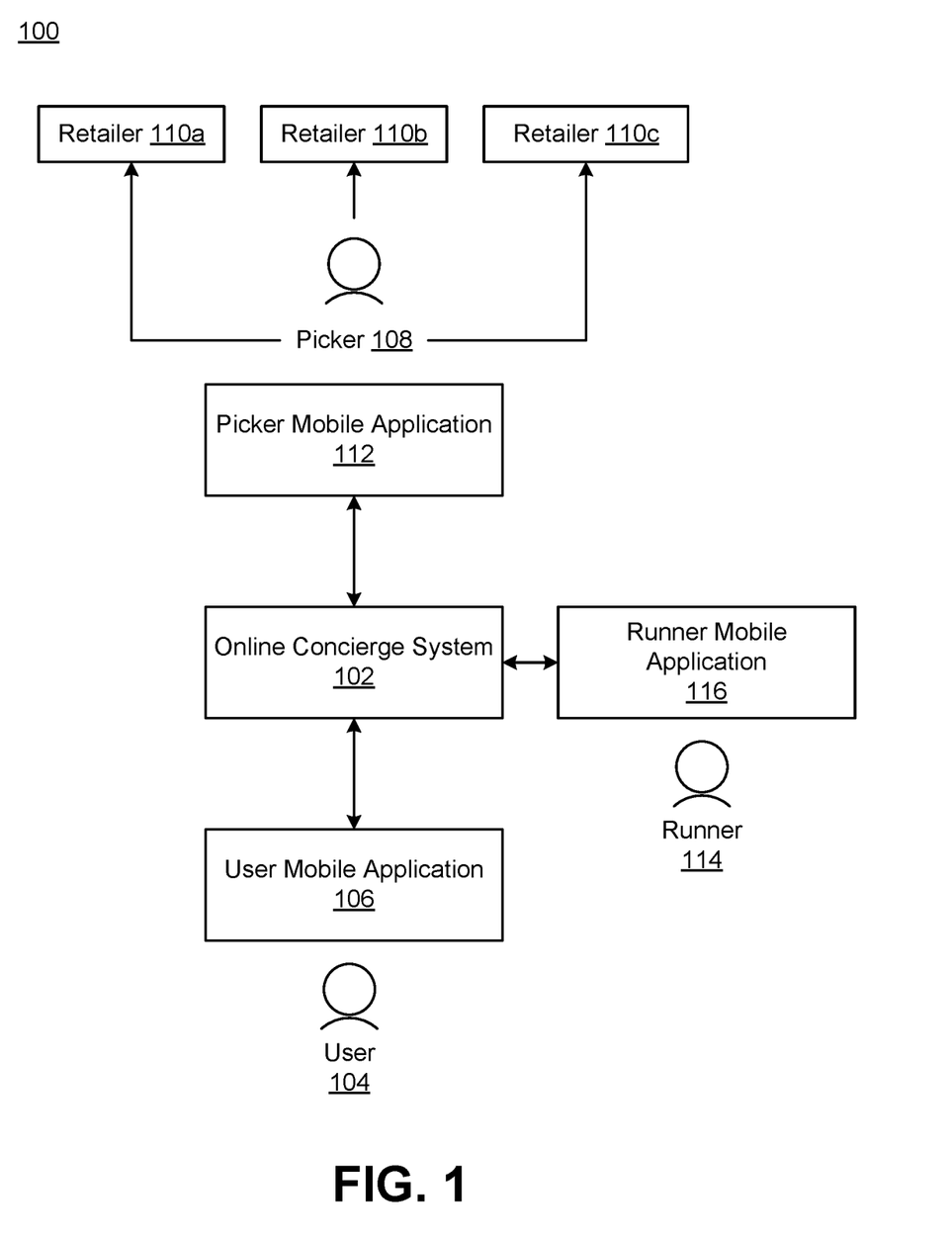
FIG. 1 illustrates the environment of an online concierge system, in accordance with some embodiments.

FIG. 1 illustrates the environment 100 of an online concierge system 102, according to some embodiments. The figures use like reference numerals to identify like elements. A letter after a reference numeral, such as "110*a*," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The online concierge system 102 is configured to receive orders from one or more users 104 (only one is shown for the sake of simplicity). An order specifies a list of goods or products to be delivered to the user 104. Goods, items, and products may be used synonymously herein to mean any item that a user 104 can purchase via the online concierge system. The order also specifies the location to which the goods are to be delivered, and a time window during which the goods should be delivered. In some embodiments, the order specifies one or more retailers from which the selected items should be purchased. The user may use a user mobile application (UMA) 106 to place the order; the UMA 106 is configured to communicate with the online concierge system 102.

The online concierge system 102 is configured to transmit orders received from users 104 to one or more pickers 108. A picker 108 may be a contractor, employee, or other person (or entity) who is enabled to fulfill orders received by the online concierge system 102. The environment 100 also includes three retailers 110a, 110b, and 110c (only three are shown for the sake of simplicity; the environment could include any number of retailers). The retailers 110 may be physical retailers, such as grocery stores, discount stores, department stores, etc., or non-public warehouses storing items that can be collected and delivered to users. Each picker 108 fulfills an order received from the online concierge system 102 at one or more retailers 110, delivers the order to the user 104, or performs both fulfillment and delivery. In some embodiments, pickers 108 make use of a picker mobile application 112 which is configured to interact with the online concierge system 102.

Online Concierge System

Figure 2:
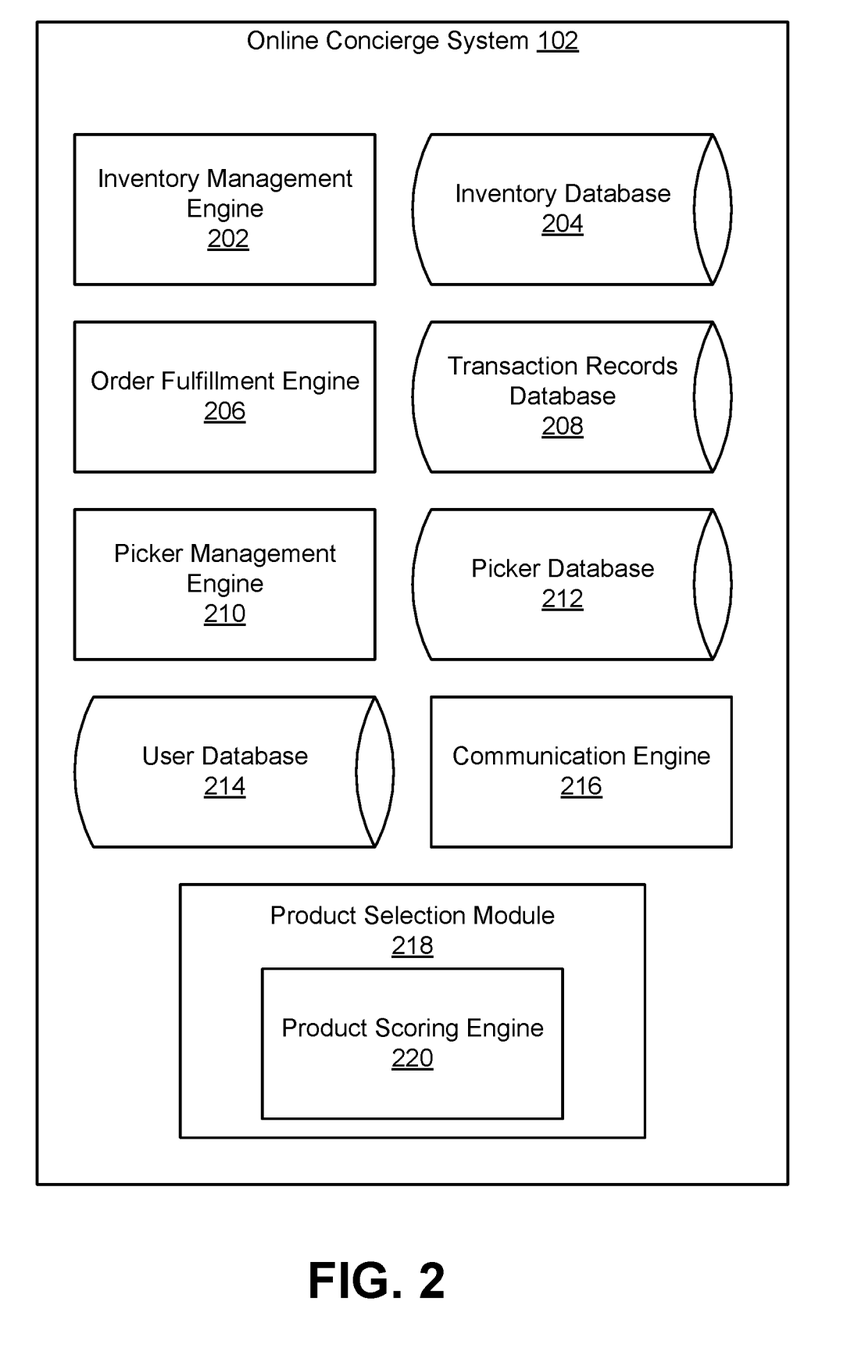
FIG. 2 is a block diagram of an online concierge system, in accordance with some embodiments.

FIG. 2 is a block diagram of an online concierge system 102, according to some embodiments. The online concierge system 102 includes an inventory management engine 202, which interacts with inventory systems associated with each retailer 110. In some embodiments, the inventory management engine 202 requests and receives inventory information maintained by the retailer 110. The inventory of each retailer 110 is unique and may change over time. The inventory management engine 202 monitors changes in inventory for each participating retailer 110. The inventory management engine 202 is also configured to store inventory records in an inventory database 204. The inventory database 204 may store information in separate records—one for each participating retailer 110—or may consolidate or combine inventory information into a unified record. Inventory information includes both qualitative and quantitative information about items, including size, color, weight, SKU, serial number, and so on. In some embodiments, the inventory database 204 also stores purchasing rules associated with each item, if they exist. For example, age-restricted items such as alcohol and tobacco are flagged accordingly in the inventory database 204.

The online concierge system 102 also includes an order fulfillment engine 206 which is configured to synthesize and display an ordering interface to each user 104 (for example, via the user mobile application 106). The order fulfillment engine 206 is also configured to access the inventory database 204 in order to determine which products are available at which retailers 110. The order fulfillment engine 206 determines a sale price for each item ordered by a user 104. Prices set by the order fulfillment engine 206 may or may not be identical to in-store prices determined by retailers (which is the price that users 104 and pickers 108 would pay at retailers). The order fulfillment engine 206 also facilitates transactions associated with each order. In some embodiments, the order fulfillment engine 206 charges a payment instrument associated with a user 104 when he/she places an order. The order fulfillment engine 206 may transmit payment information to an external payment gateway or payment processor. The order fulfillment engine 206 stores payment and transactional information associated with each order in a transaction records database 208.

In some embodiments, the order fulfillment engine 206 also shares order details with retailer 110. For example, after successful fulfillment of an order, the order fulfillment engine 206 may transmit a summary of the order to the appropriate retailer. The summary may indicate the items purchased, the total value of the items, and in some cases, an identity of the picker 108 and user 104 associated with the transaction. In some embodiments, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a picker management engine 210, which manages communication with and utilization of pickers 108. In some embodiments, the picker management engine 210 receives a new order from the order fulfillment engine 206. The picker management engine 210 identifies the appropriate retailer 110 to fulfill the order based on one or more parameters, such as the contents of the order, the inventory of the retailers, and the proximity to the delivery location. The picker management engine 210 then identifies one or more appropriate pickers 108 to fulfill the order based on one or more parameters, such as the pickers' proximity to the appropriate retailer 110 (and/or to the user 104), his/her familiarity level with that particular retailer 110, and so on. Additionally, the picker management engine 210 accesses a picker database 212 which stores information describing each picker 108, such as his/her name, rating, previous shopping history, and so on. The picker management engine 210 transmits the list of items in the order to the picker 108 via the picker mobile application 112. The picker database 212 may also store data describing the sequence in which the pickers picked the items in their assigned orders.

As part of fulfilling an order, the order fulfillment engine 206 and/or picker management engine 210 may access a user database 214 which stores information describing each user. This information could include each user's name, address, gender, shopping preferences, favorite items, stored payment instruments, and so on.

The online concierge system 102 may use a communication engine 216 that transmits information between the user mobile application 106, the picker mobile application 112, and the runner mobile application 116. The information may be sent in the form of messages, such as texts or emails, or notifications via application, among other forms of communication. The communication engine 216 may receive information from each application about the status of an order, the location of a user in transit, issues with items in an order, and the like. The communication engine 216 determines a message or notification to send to a user 104, picker 108, or runner 114 based on this information and transmits the notifications to the appropriate application. For example, the online concierge system 102 may receive information from the user mobile application 106 indicating that a user 104 is traveling to the pickup location to retrieve an order. Based on this information, the communication engine 216 sends a notification to the runner mobile application 116 indicating that the user 104 associated with a specific order is in transit, which may incite the runner 114 to retrieve the order for pick up. In another example, the online concierge system 102 may receive a message from the picker mobile application 112 that an item of an order is not available. The communication engine 216 may transmit the message to the user mobile application 106 associated with the order.

The product selection module 218 selects products to be presented to the user. The product selection module 218 selects products to present to the user based on a relevance or affinity of the products to the user. The relevance or affinity of a product for a user may be a score for the product that is based on a likelihood that the user will interact with the product if presented to the user. The product selection module 218 may then select products based on a score for each product. For example, the product selection module 218 may rank the products based on the score and select a set of products to present to a user based on the ranking of the products. When the online concierge system 102 identifies an opportunity to present products to a user, the product selection module 218 may score all products that are available for purchase on the online concierge system 102 or may only score a set of candidate products that are likely relevant to the user.

The product selection module 218 may determine the relevance of a product to a user based on one or more machine-learning models (e.g., a neural network) that have been trained to determine the relevance of products to users. The product selection module 218 may determine the relevance of a product to a user based on information about the user, the type of product, whether the user has ordered the product before (and if so, how recently), whether the product is related to other products the user has ordered or the relevance of the product to a search query provided by the user. The product selection module 218 may present the selected products to the user as search results, a feed of potentially relevant products, or as part of an ordered list of all products available to the user.

In some embodiments, the product selection module 218 selects products to present to the user in response to a search query by the user. A search query is a string of text that represents a user's interest in being presented with a set of products related to that text. For example, if the user provides a search query of "ground beef" the user is likely interested in ground beef products available for purchase via the online concierge system. Accordingly, the product selection module 218 may present ground beef products to the user in response to the user's search query.

The product selection module 218 uses a product scoring engine 220 to score products to be presented as search results to a user. The product scoring engine 220 uses one or more machine-learning models that are trained to score products. The product scoring engine 220 is discussed in further detail below in the context of FIG. 4. Note that, while the description herein may primarily describe the product scoring engine 220 as scoring products to present to a user in response to a search query, the product scoring module 220 may be used to score products to present to a user in contexts other than search results. For example, the product scoring module 220 may generically score products to present to a user based on user data about the user, product data about candidate products to present, and context data describing the user's session with the online concierge system 102.

Figure 3A:
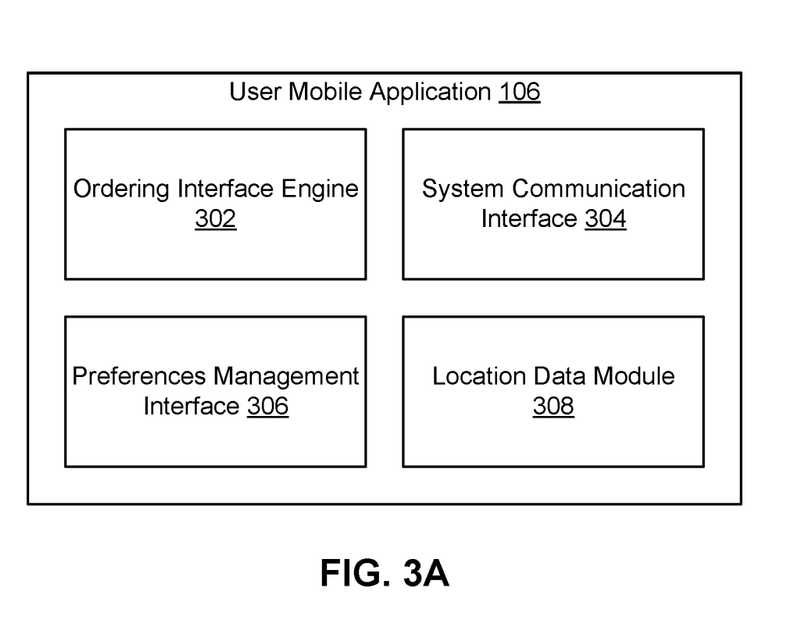
FIG. 3A is a block diagram of the user mobile application (UMA), in accordance with some embodiments.

FIG. 3A is a block diagram of the user mobile application (UMA) 106, according to some embodiments. The user 104 accesses the UMA 106 via a client device, such as a mobile phone, tablet, laptop, or desktop computer. The UMA 106 may be accessed through an app running on the client device or through a website accessed in a browser. The UMA 106 includes an ordering interface 302, which provides an interactive interface with which the user 104 can browse through and select products and place an order. The ordering interface 302 also may include a selected products list that specifies the amounts and prices of products that the user 104 has selected to order. The user 104 may review the selected products list and place an order based on the selected products list. Furthermore, the ordering interface 302 may present recipes to the user 104 that the online concierge system 102 predicts the user 104 is attempting to complete, and may provide an option to the user 104 to add additional products needed to complete a recipe to the user's selected products list.

The ordering interface 302 may allow a user to search for products offered for sale on the online concierge system 102. For example, the ordering interface 302 may include elements that the user may use to enter a search query. Once the user enters a search query, the ordering interface 302 may present to the user a set of search results that the online concierge system 102 determines are relevant to the user's search. The ordering interface 302 may also include elements that allow the user to order products that are presented as part of the set of search results.

Users 104 may also use the ordering interface 302 to message with pickers 108 and runners 114 and receive notifications regarding the status of their orders. The UMA 106 also includes a system communication interface 304 which, among other functions, receives inventory information from the online concierge system 102 and transmits order and location information to the online concierge system 102. The UMA 106 also includes a preferences management interface 306 which allows the user 104 to manage basic information associated with his/her account, such as his/her home address and payment instruments. The preferences management interface 306 may also allow the user to manage other details such as his/her favorite or preferred retailers 110, preferred handoff times, special instructions for handoff, and so on.

The UMA 106 also includes a location data module 308. The location data module 308 may access and store location data related to a client device associated with a user 104 via the user mobile application 106. Location data may include the geographic location of the client device associated with the user mobile application 106, how fast the client device is traveling, the average speed of the client device when in transit, the direction of travel of the client device, the route the user 104 is taking to a pickup location, current traffic data near the pickup location, and the like. For simplicity, the location of a user client device or client device may be referred to as the location of the user throughout this description. The user 104 may specify whether or not to share this location data with the user mobile application 106 via the preferences management interface 306. If a user 104 does not allow the user mobile application 106 to access their location data, the location data module 308 may not access any location data for the user 104. In some embodiments, the user 104 may specify certain scenarios when the location data module 308 may receive location data, such as when the user 104 is using the user mobile application 106, any time, or when the user 104 turns on location tracking in the user mobile application 106 via an icon. The user 104 may also specify which location data the location data module 308 may retrieve, and which location data is off-limits. In some embodiments, the location data module 308 may be tracking the user's 104 location as a background process while the UMA 106 is in use. In other embodiments, the UMA 106 may use real-time location data from the location data module 308 to display a map to the user 104 indicating their current location and the route to a pickup location for their order.

Figure 3B:
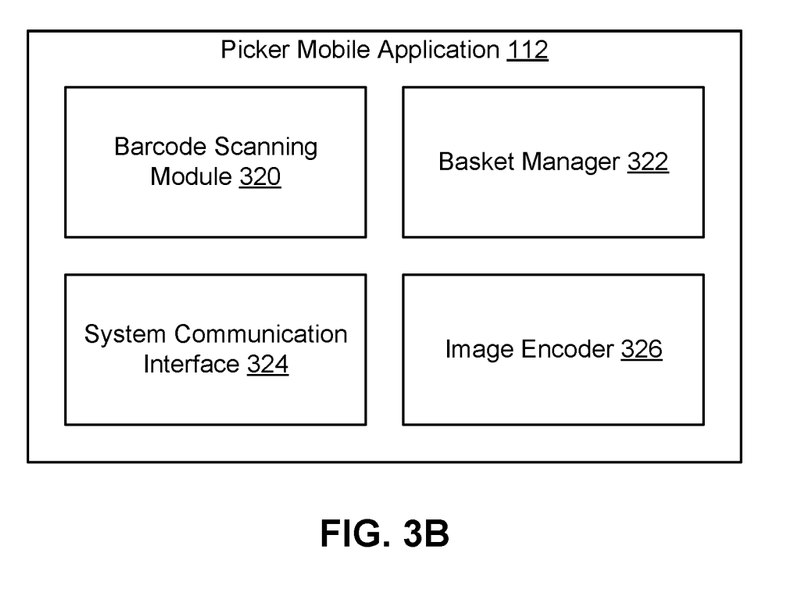
FIG. 3B is a block diagram of the picker mobile application (PMA), in accordance with some embodiments.

FIG. 3B is a block diagram of the picker mobile application (PMA) 112, according to some embodiments. The picker 108 accesses the PMA 112 via a mobile client device, such as a mobile phone or tablet. The PMA 112 may be accessed through an app running on the mobile client device or through a website accessed in a browser. The PMA 112 includes a barcode scanning module 320 which allows a picker 108 to scan an item at a retailer 110 (such as a can of soup on the shelf at a grocery store). The barcode scanning module 320 may also include an interface which allows the picker 108 to manually enter information describing an item (such as its serial number, SKU, quantity and/or weight) if a barcode is not available to be scanned. The PMA 112 also includes a basket manager 322 which maintains a running record of items collected by the picker 108 for purchase at a retailer 110. This running record of items is commonly known as a "basket". In some embodiments, the barcode scanning module 320 transmits information describing each item (such as its cost, quantity, weight, etc.) to the basket manager 322, which updates its basket accordingly. The PMA 112 also includes an image encoder 326 which encodes the contents of a basket into an image. For example, the image encoder 326 may encode a basket of goods (with an identification of each item) into a QR code which can then be scanned by an employee of the retailer 110 at check-out.

The PMA 112 also includes a system communication interface 324, which interacts with the online concierge system 102. For example, the system communication interface 324 receives information from the online concierge system 102 about the items of an order, such as when a user updates an order to include more or less items. The system communication interface may receive notifications and messages from the online concierge system 102 indicating information about an order. The system communication interface transmits notifications and messages to be displayed via a user interface of the mobile device associated with the PMA 112.

Figure 3C:
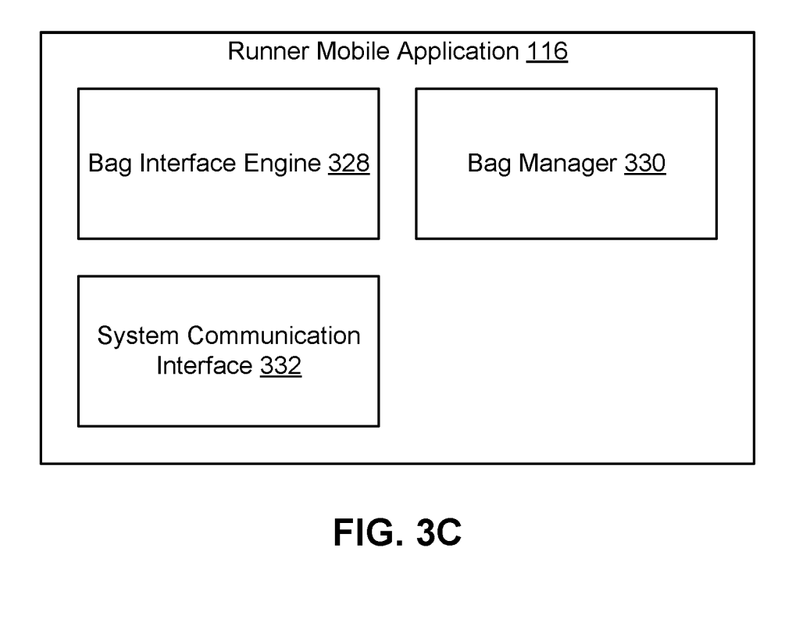
FIG. 3C is a block diagram of the runner mobile application (RMA), in accordance with some embodiments.

FIG. 3C is a block diagram of the runner mobile application (RMA) 116, according to some embodiments. The runner 114 accesses the RMA 116 via a client device, such as a mobile phone, tablet, laptop, or desktop computer. The RMA 116 may be accessed through an app running on the client device or through a website accessed in a browser. The RMA 116 includes bag interface engine 328, which provides an interactive interface with which the runner 114 can view orders they need to deliver and the locations of the bags for each order, such as on a particular shelf or in a refrigerator of a pickup location. The runner 114 may receive notifications through the bag interface engine 328 about new orders, the location of a user 104 who is in transit to a pickup location, and new orders to deliver. The runner 114 may also receive communications via the bag interface engine 328 with users regarding order handoff and pickup confirmation and may interact with the interface generated by the bag interface engine 328 to send communications to users and the online concierge system 102 regarding order status. For example, a runner 114 may send the user a pickup spot at the pickup location to meet for order handoff and indicate that an order has been delivered to a user via the interface, which ends the wait time calculation by the location data module 308 associated with the user.

The RMA 116 includes a bag manager 330 that manages the assignment of orders to runners 114 and the locations of bags for each order. The RMA 116 also includes a system communication interface 332 which, among other functions, receives inventory information from the online concierge system 102 and transmits order and bag information to the online concierge system 102. The system communication interface may also receive notifications and messages from the online concierge system 102 indicating information about an order. The system communication interface transmits notifications and messages to be displayed via a user interface of the mobile device associated with the RMA 116.

Example Product Scoring Engine

Figure 4:
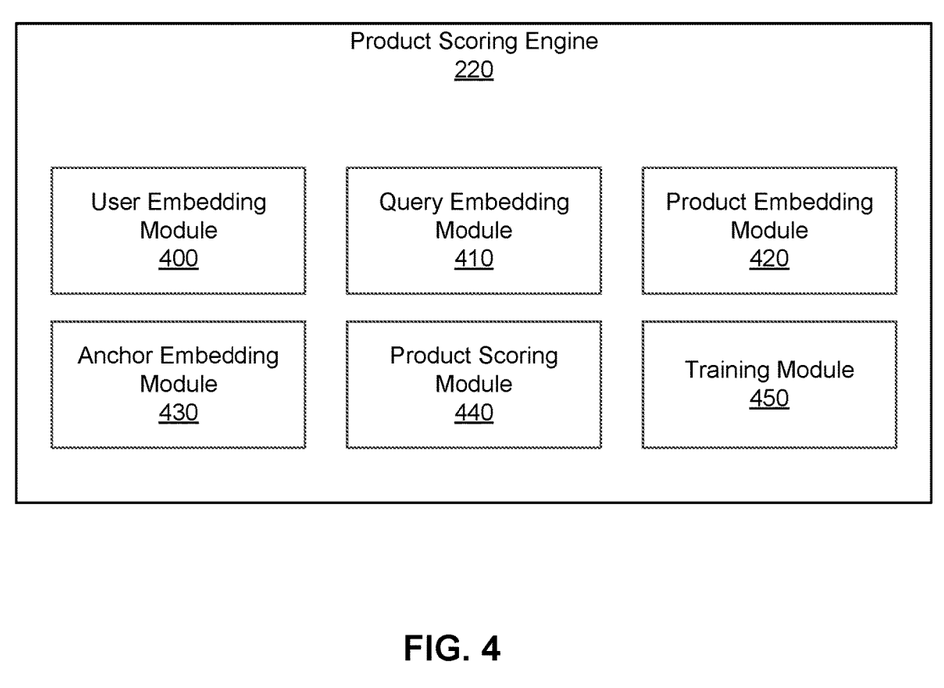
FIG. 4 is a block diagram for a product scoring engine, in accordance with some embodiments.

FIG. 4 is a block diagram for a product scoring engine 220, according to some embodiments. The product scoring engine 220 comprises a user embedding module 400, a query embedding module 410, a product embedding module 420, an anchor embedding module 430, a product scoring module 440, and a training module 450. Alternative embodiments may include more, fewer, or different components from those illustrated in FIG. 4, and the functionality of each component may be divided between the components differently from the description below. Additionally, each component may perform their respective functionalities in response to a request from a human, or automatically without human intervention.

The user embedding module 400 generates user embeddings for users using the online concierge system 102. Each user embedding is an embedding that describes characteristics or features about an associated user. The user embedding module 400 generates user embeddings for a user based on user data. User data is data that describes characteristics about a user that may be relevant for determining the relevance of a product to a user. For example, user data may include one or more of the user's name, the user's location, the user's stated preferences, the user's previously ordered products, the user's frequency of placing orders, which retailers the user orders from, a typical order cost for the user, or a browsing history of the user on the UMA 106 or other applications the user may use. User data may include raw data, preprocessed data, or feature sets describing information about a user. In some embodiments, the data collection module 400 collects user data from the user database 214. The user embedding module 400 may store generated user embeddings in the user database 214 and associate, within the user database 214, each user embedding with a user that the user embedding describes.

In some embodiments, the user embedding module 400 uses one or more user models to generate user embeddings. User models are machine-learning models (e.g., neural networks) that are trained to generate user embeddings based on user data. The user embedding module 400 can also retrieve a user embedding associated with a specified user from the user database 214.

The query embedding module 410 generates a query embedding for the user's search query. A query embedding is an embedding that describes features of the user's search query. The query embedding module generates a query embedding based on search query data. Query data is data describing a user's search query for the online concierge system 102. For example, query data may include one or more of search query text, previous searches by the user within the user's session, or search queries conducted by other users of the online concierge system 102. Query data may also include context data describing the context in which the user has queried the online concierge system 102 for products. For example, the context data may include one or more of how long the user's session with the online concierge system 102 has lasted, the products that are currently in the user's selected products list, or other products with which the user has interacted during the session. Query data may include raw data, preprocessed data, or feature sets describing information about a query or context.

The query embedding module 410 uses one or more query embedding models to generate a query embedding. Query embedding models are machine-learning models (e.g., neural networks) that are trained to generate query embeddings based on search query data.

The product embedding module 420 generates a product embedding for products being evaluated by the product scoring engine 220. A product embedding is an embedding that describes a product. The product embeddings may be associated with specific products stored by the inventory database 204. For example, each brand of a product may have an individual product embedding, or products may have different product embeddings for each retailer that sells the product. Alternatively, each product embedding may be associated with a generic product, and each generic product is associated with specific products that are similar or substitutes of each other. For example, the inventory database 102 may store a product embedding for the generic product "milk", and the specific products of "Moo Moo 2% Milk" and "Greener Pastures Organic Whole Milk" may both be associated with the product embedding for "milk." In some embodiments, product embeddings are stored in the inventory database 204.

The product embedding module 420 uses one or more product embedding models to generate a product embedding based on product data. A product embedding model is one or more machine-learning models (e.g., neural networks) that are trained to generate product embeddings based on product data. Product data is data that describes characteristics about products available for purchase using the online concierge system 102. For example, product data may include one or more of a product name, a product type, whether a product is associated with a recipe, retailers that offer the product for sale, the shelf-life of a product, identifiers for other products with which the product is commonly purchased, a popularity of the product, the availability of a product, the price of a product, any restrictions that may be in place on the purchase of the product, whether the product is a food item, a frequency with which the product is purchased using the online concierge system 102, other products which the product has been or may be presented, or an expense incurred by the online concierge system 102 to provide the product to the user. Product data may include raw data, preprocessed data, or feature sets describing information about a product.

The anchor embedding module 430 generates anchor embeddings based on user embeddings and query embeddings. An anchor embedding is an embedding of the same dimension and in the same embedding space as a product embedding. The anchor embedding can therefore be compared to product embeddings to determine products that would be relevant to present to a user in response to a search query. The anchor embedding module 430 may use one or more anchor embedding models to generate an anchor embedding. Anchor embedding models are machine-learning models (e.g., neural networks) that are trained to generate anchor embeddings based on user embeddings and query embeddings.

The product scoring module 440 generates product scores for products. A product score is a score for a product that indicates the product's affinity for being presented to a user in response to a search query from the user. A product score may represent a likelihood that the user will interact with the product if the product is presented to the user or may represent some expected value based on the likelihood of user interaction and the value of the user's interaction with the product. The product scoring module 440 generates product scores for products based on a comparison of an anchor embedding with a set of product embeddings associated with a set of candidate products. The set of candidate products can include all products available on the online concierge system 102 or a subset of the products. The anchor embedding is generated by the anchor embedding module 430 based on a query embedding for the search query and a user embedding for the user who submitted the search query. The product scoring module 440 may compare the anchor embedding with the set of product embeddings by calculating a Euclidean distance, a cosine distance, or a dot product of the anchor embedding and each product embedding.

Additionally, the product scoring module 440 may use a machine-learning model (e.g., a neural network) trained to generate product scores for products based on product embeddings associated with the products and an anchor embedding. In some embodiments, the machine-learning model generates product scores based on comparisons of product embeddings for the set of candidate products with an anchor embedding.

The training module 450 evaluates the performance of the machine-learning models used by the product scoring engine 220 so that the machine-learning models can be trained to perform more effectively. For example, the training module 412 may evaluate the performance of user embedding models, query embedding models, product embedding models, or anchor embedding models. In some embodiments, the training module 450 uses a loss function to train machine-learning models used by the product scoring engine 220. The loss function may optimize the machine-learning models used by the product scoring engine 220 such that the product scoring engine 220 generates product scores for products representing an affinity of the products for being presented to a user in response to a search query from the user. In some embodiments, the training module 450 backpropagates the loss function through the anchor embedding models, the product embedding models, the query embedding models, and the user embedding models. The training module 450 also may apply a machine-learning model to the anchor embedding and a set of product embeddings to train the machine-learning models used by the product scoring engine 220.

In some embodiments, the training module 450 uses a loss function that is based on the triplet loss function. The modified triplet loss function may assign different weights to different types of interactions that are considered positive examples based on a hierarchy of interactions. The hierarchy of interactions may reflect that certain interactions are more valuable to the online concierge system 102 than other interactions. For example, a purchase interaction (i.e., where a user purchases a product) may be more valuable than a select interaction (i.e., where the user adds the product to a selected products list), which itself may be more valuable than a click interaction (i.e., where the user selects a product to see more information about the product). The training module 450 may use weights in a modified triplet loss function that emphasizes minimizing the distance from higher tier positive examples than from lower tier positive examples. For example, the training module may use the following as a loss function:

$$L = \sum_{i=1}^{M} \max(\delta_{i_1} \beta_1 dist(AE, PE_{P_i}) + \ldots + \delta_{i_n} \beta_n dist(AE, PE_{P_i}) - dist(AE, PE_{N_i}) + \alpha, 0)$$

For this example loss function, AE is an anchor embedding for a user who submitted a search query, $PE_P$ is a product embedding of a positive training example (e.g., where the user interacted with a presented product), and $PE_N$ is a product embedding of a negative training example (e.g., where the user did not interact with a presented product). The function dist is a function that computes the distance between two embeddings (e.g., the Euclidean distance). In the example loss function, there are n types of positive interactions that a user can take with regards to a product and those different types of interactions are weighted using weights $\beta_1 \ldots \beta_n$. These weights can assign greater value to more valuable interactions by increasing the loss value of a distance between the anchor embedding and the positive example. Additionally, the example loss function uses indicator variables $\delta_1 \ldots \delta_n$ to apply the correct weight $\beta$ to the positive example. The only indicator variable with a non-zero value is the indicator variable that corresponds to the type of interaction represented by the positive example. Furthermore, M is the number of search examples used to train the machine-learning models and $\alpha$ is a hyperparameter controlling the margin in the example loss function.

Training an Example Product Scoring Engine

Figure 5:
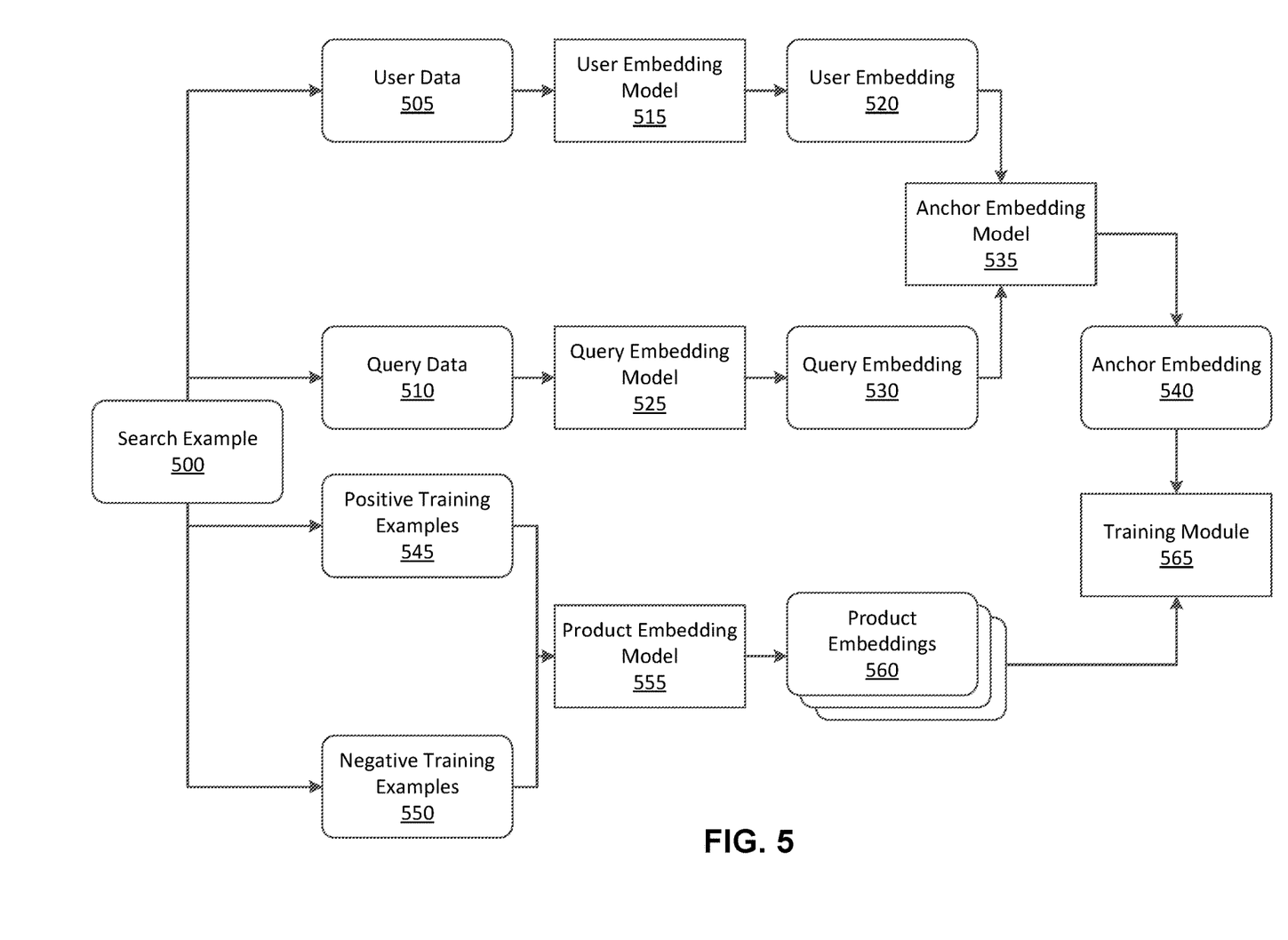
FIG. 5 illustrates data flow through an example product scoring engine during a training process, in accordance with some embodiments.

FIG. 5 illustrates data flow through an example product scoring engine during a training process, in accordance with some embodiments. Alternative embodiments may include more, fewer, or different components from those illustrated in FIG. 5, and the functionality of each component may be divided between the components differently from the description below. Additionally, each component may perform their respective functionalities in response to a request from a human, or automatically without human intervention.

The product scoring engine receives a search example 500 related to an instance where a user submitted a search query to the online concierge system and was presented with a set of products in response to the search query. The search example 500 includes user data 505 associated with the user who submitted the search query and query data 510 associated with the search query. A user embedding model 515 generates a user embedding 520 based on the user data 505 and the query embedding model 525 generates a query embedding 530 based on the query data 510. In some embodiments, the user embedding model 515 is a machine learning model used by a user embedding module 400 of the product scoring engine. Similarly, in some embodiments, the query embedding model 525 is a machine-learning model used by a query embedding module 410 of the product scoring engine. The anchor embedding model 535 generates an anchor embedding 540 based on the user embedding 520 and the query embedding 530. In some embodiments, the anchor embedding model 535 is a machine-learning model used by an anchor embedding module 430 of the product scoring engine.

The search example 500 includes a set of positive training examples 545 and a set of negative training examples 550. The set of positive training examples 545 are a set of products with which the user interacted when those products were presented to the user in response to the search query. For example, the set of positive training examples 545 may include products that the user purchased, selected to add to a selected products list, or selected to view more details about the product. The set of negative training examples 550 are a set of products with which the user did not interact when those products were presented to the user in response to the search query.

The product embedding model 555 generates product embeddings 560 based on the set of positive training examples 545 and the set of negative training examples 550. In some embodiments, the product embedding model 555 is a machine-learning model used by a product embedding module 420 of the product scoring engine. The training module 565 then evaluates the performance of the user embedding model 515, the query embedding model 525, the anchor embedding model 535, and the product embedding model 555 by applying a loss function to the anchor embedding 540 and the set of product embeddings 560. In some embodiments, the loss function is a modified version of the triplet loss function, and the anchor embedding 540 is compared to pairs of product embeddings, where the pairs of product embeddings have a product embedding corresponding to each of a positive training example 545 and a negative training example 550.

Applying an Example Product Scoring Engine

Figure 6:
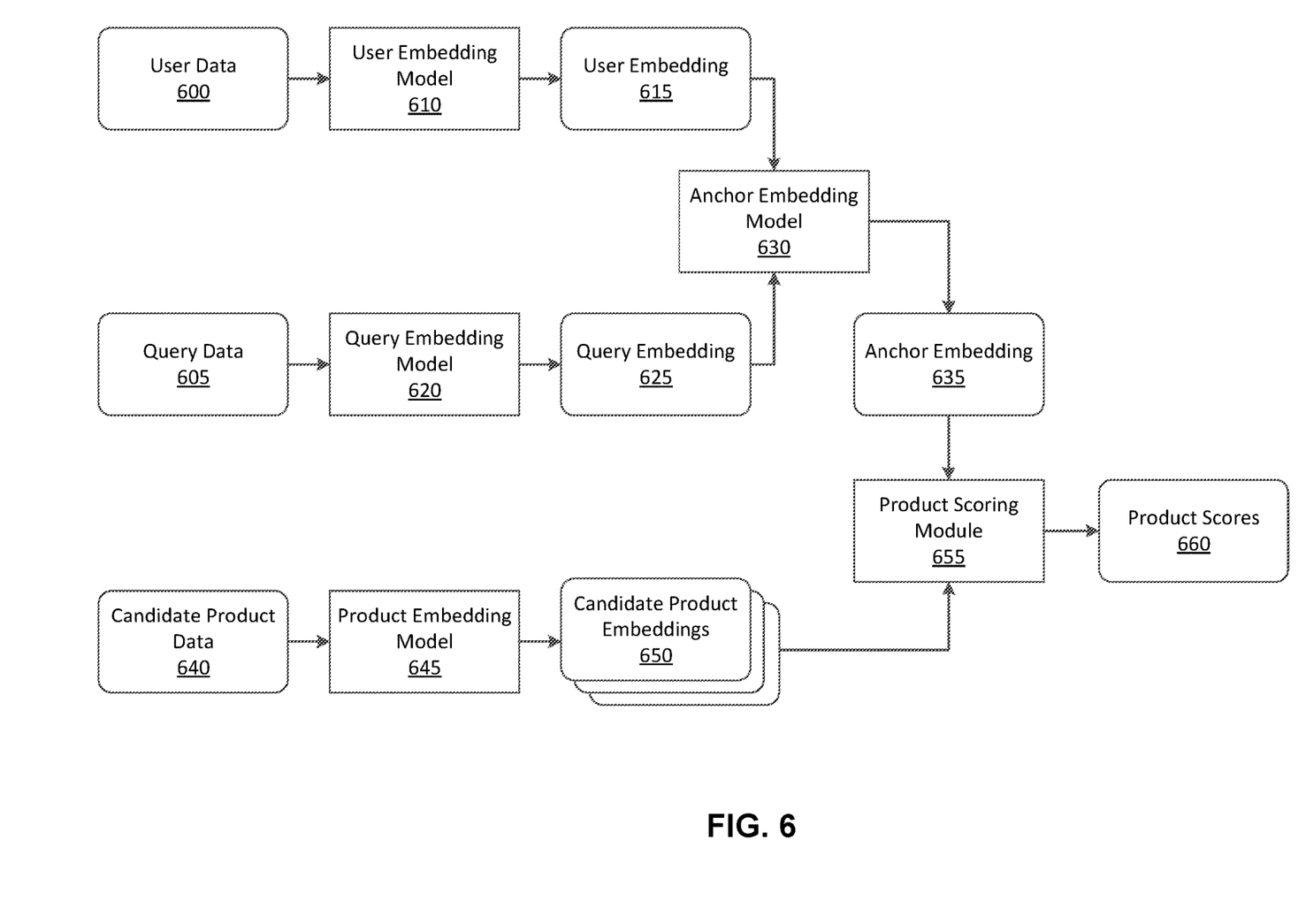
FIG. 6 illustrates data flow through an example product scoring engine during application of the example product scoring engine, in accordance with some embodiments.

FIG. 6 illustrates data flow through an example product scoring engine during application of the example product scoring engine, in accordance with some embodiments. Alternative embodiments may include more, fewer, or different components from those illustrated in FIG. 6, and the functionality of each component may be divided between the components differently from the description below. Additionally, each component may perform their respective functionalities in response to a request from a human, or automatically without human intervention.

The product scoring engine receives user data 600 and query data 605 related to a user's search query. The user data 600 describes a user who submitted the search query and the query data 605 describes the search query submitted by the user. The user embedding model 610 generates a user embedding 615 based on the user data 600 and the query embedding model 620 generates a query embedding 625 based on the query data 605. The anchor embedding model 630 generates an anchor embedding 635 based on the user embedding 615 and the query embedding 625.

The product scoring engine selects a set of candidate products for consideration and receives product data 640 associated with the set of candidate products. The product embedding model 645 generates a set of candidate product embeddings 650 based on the product data 640 for the set of candidate products.

The product scoring module 655 generates a product score 660 for each of the set of candidate products based on the generated candidate product embeddings 650. The product scoring module 655 may score the candidate product embeddings 650 based on a distance of the candidate product embedding from the anchor embedding 635. For example, a product score 660 may be based on a Euclidean distance, a cosine distance, or a dot product of the anchor embedding 635 and a candidate product embedding 650.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

What is claimed is:

1. A non-transitory computer-readable medium storing a set of parameters for one or more machine-learning models, wherein the set of parameters are generated by a process comprising:
   storing the set of parameters, where the set of parameters comprise:
   a set of parameters for a user embedding model comprising a first neural network that generates user embeddings based on user data;
   a set of parameters for a query embedding model comprising a second neural network that generates query embeddings based on query data;
   a set of parameters for an anchor embedding model comprising a third neural network that generates anchor embeddings based on user embeddings and query embeddings, where an anchor embedding is an embedding in a product embedding space; and
   a set of parameters for a product embedding model comprising a fourth neural network that generates product embeddings based on product data;

accessing a set of search examples at an online concierge system, where each search example of the set of search examples comprises:
        user data associated with a user of the online concierge system;
        query data associated with a search query submitted by the user to the online concierge system;
        product data associated with a set of products presented to the user by the online concierge system in response to the search query; and
        a label for each product of the set of products, where each label comprises at least one of an indication of whether the user interacted with the product and an indication of a type of interaction the user performed with the product; and
    for each search example in the set of search examples:
        generating a user embedding by applying the user embedding model to the user data of the search example, wherein applying the user embedding model to the user data comprises inputting the user data to an input layer of the first neural network of the user embedding model;
        generating a query embedding by applying the query embedding model to the query data of the search example, wherein applying the query embedding model to the query data comprises inputting the query data to an input layer of the second neural network of the query embedding model;
        generating an anchor embedding by applying the anchor embedding model to the user embedding and the query embedding, wherein applying the anchor embedding model to the user embedding and the query embedding comprises inputting the user embedding and the query embedding to an input layer of the third neural network of the anchor embedding model, wherein the input layer of the third neural network of the anchor embedding model is coupled to an output layer of the first neural network of the user embedding model and an output layer of the second neural network of the query embedding model;
        generating a set of product embeddings by applying the product embedding model to product data of the search example, wherein applying the product embedding model to the product data comprises inputting the product data to an input layer of the neural network of the product embedding model;
        computing a set of distances between the anchor embedding and the set of product embeddings; and
        updating the set of parameters based on a loss function applied to the set of distances and the label associated with each product of the set of products associated with the set of product embeddings.

2. The computer-readable medium of claim 1, wherein applying the loss function comprises:
    applying a first weight to a first subset of the set of product embeddings, wherein the first subset consists of one or more product embeddings associated with products with which the user performed an interaction of a first type; and
    applying a second weight to a second subset of the set of product embeddings, wherein the second subset consists of one or more product embeddings associated with products with which the user performed an interaction of a second type, wherein the first weight is different from the second weight, and wherein the first type of interaction is different from the second type of interaction.

3. The computer-readable medium of claim 2, wherein the first type of interaction and the second type of interaction are each one of: a purchase of a product, an addition of a product to a selected products list, and a selection of a product to view more information about the product.

4. The computer-readable medium of claim 1, wherein computing the set of distances between the anchor embedding and the set of product embeddings comprises: computing at least one of a Euclidean distance, a cosine distance, or a dot product.

5. The computer-readable medium of claim 1, wherein updating the set of parameters based on the loss function comprises optimizing the set of parameters for:
    minimizing a distance between the anchor embedding and a first product embedding of the set of product embeddings, wherein the first product embedding is associated with a product with which the user interacted; and
    maximizing a distance between the anchor embedding and a second product embedding of the set of product embeddings, wherein the second product embedding is associated with a product with which the user did not interact.

6. The computer-readable medium of claim 1, wherein user data for a search example of the set of search examples comprises at least one of: a location of a user, products previously ordered by a user, and a browsing history of a user.

7. The computer-readable medium of claim 1, wherein the query data for a search example of the set of search examples comprises search query text associated with a search query.

8. The computer-readable medium of claim 1, wherein the query data for a search example of the set of search examples comprises context data associated with a session of a user.

9. The computer-readable medium of claim 1, wherein updating the set of parameters comprises updating at least one of: the set of parameters for the user embedding model; the set of parameters for the query embedding model, the set of parameters for the anchor embedding model, and the set of parameters for the product embedding model.

10. A method comprising:
    storing a set of parameters, where the set of parameters comprise:
        a set of parameters for a user embedding model comprising a first neural network that generates user embeddings based on user data;
        a set of parameters for a query embedding model comprising a second neural network that generates query embeddings based on query data;
        a set of parameters for an anchor embedding model comprising a third neural network that generates anchor embeddings based on user embeddings and query embeddings, where an anchor embedding is an embedding in a product embedding space; and
        a set of parameters for a product embedding model comprising a fourth neural network that generates product embeddings based on product data;
    accessing a set of search examples at an online concierge system, where each search example of the set of search examples comprises:
        user data associated with a user of the online concierge system;

query data associated with a search query submitted by the user to the online concierge system;

product data associated with a set of products presented to the user by the online concierge system in response to the search query; and a label for each product of the set of products, where each label comprises at least one of an indication of whether the user interacted with the product and an indication of a type of interaction the user performed with the product; and for each search example in the set of search examples:

generating a user embedding by applying the user embedding model to the user data of the search example, wherein applying the user embedding model to the user data comprises inputting the user data to an input layer of the first neural network of the user embedding model;

generating a query embedding by applying the query embedding model to the query data of the search example, wherein applying the query embedding model to the query data comprises inputting the query data to an input layer of the second neural network of the query embedding model;

generating an anchor embedding by applying the anchor embedding model to the user embedding and the query embedding, wherein applying the anchor embedding model to the user embedding and the query embedding comprises inputting the user embedding and the query embedding to an input layer of the third neural network of the anchor embedding model, wherein the input layer of the third neural network of the anchor embedding model is coupled to an output layer of the first neural network of the user embedding model and an output layer of the second neural network of the query embedding model;

generating a set of product embeddings by applying the product embedding model to product data of the search example, wherein applying the product embedding model to the product data comprises inputting the product data to an input layer of the neural network of the product embedding model;

computing a set of distances between the anchor embedding and the set of product embeddings; and updating the set of parameters based on a loss function applied to the set of distances and the label associated with each product of the set of products associated with the set of product embeddings.

11. The method of claim 10, wherein applying the loss function comprises:

applying a first weight to a first subset of the set of product embeddings, wherein the first subset consists of one or more product embeddings associated with products with which the user performed an interaction of a first type; and applying a second weight to a second subset of the set of product embeddings, wherein the second subset consists of one or more product embeddings associated with products with which the user performed an interaction of a second type, wherein the first weight is different from the second weight, and wherein the first type of interaction is different from the second type of interaction.

12. The method of claim 11, wherein the first type of interaction and the second type of interaction are each one of: a purchase of a product, an addition of a product to a selected products list, and a selection of a product to view more information about the product.

13. The method of claim 10, wherein computing the set of distances between the anchor embedding and the set of product embeddings comprises:

computing at least one of a Euclidean distance, a cosine distance, or a dot product.

14. The method of claim 10, wherein updating the set of parameters based on the loss function comprises optimizing the set of parameters for:

minimizing a distance between the anchor embedding and a first product embedding of the set of product embeddings, wherein the first product embedding is associated with a product with which the user interacted; and maximizing a distance between the anchor embedding and a second product embedding of the set of product embeddings, wherein the second product embedding is associated with a product with which the user did not interact.

15. The method of claim 10, wherein user data for a search example of the set of search examples comprises at least one of: a location of a user, products previously ordered by a user, and a browsing history of a user.

16. The method of claim 10, wherein the query data for a search example of the set of search examples comprises search query text associated with a search query.

17. The method of claim 10, wherein the query data for a search example of the set of search examples comprises context data associated with a session of a user.

18. The method of claim 10, wherein updating the set of parameters comprises updating at least one of: the set of parameters for the user embedding model; the set of parameters for the query embedding model, the set of parameters for the anchor embedding model, and the set of parameters for the product embedding model.

* * * * *